4 Sheets—Sheet 1.
M. GARDNER.
SEWING MACHINE.
No. 11,412. Reissued Apr. 10, 1894.
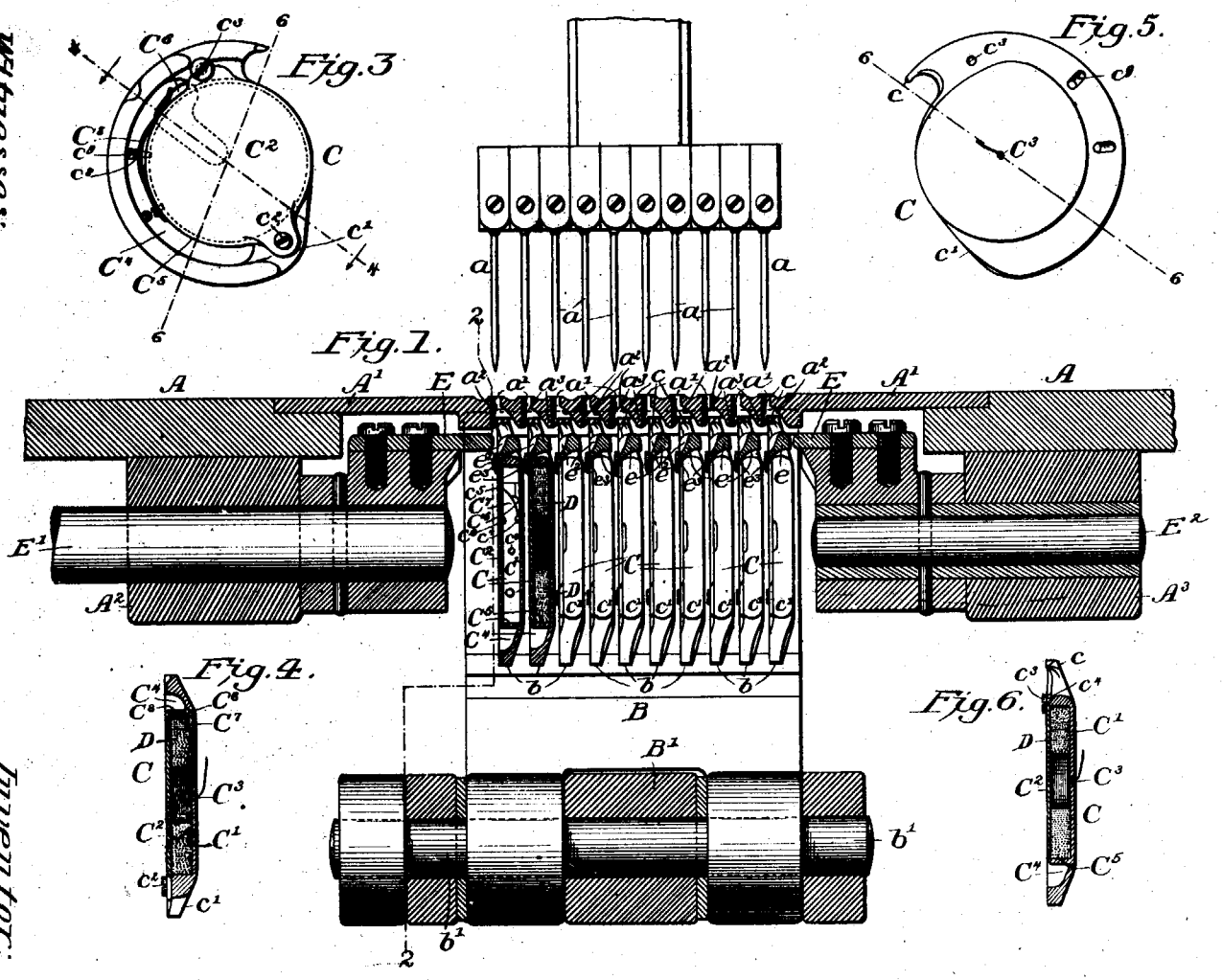
Witnesses:
R. H. Banks.
Chas. E. Riordan
Inventor:
Marshall Gardner
by Dayton, Prosser & Brown
his Attorneys

M. GARDNER.
SEWING MACHINE.
No. 11,412. Reissued Apr. 10, 1894.
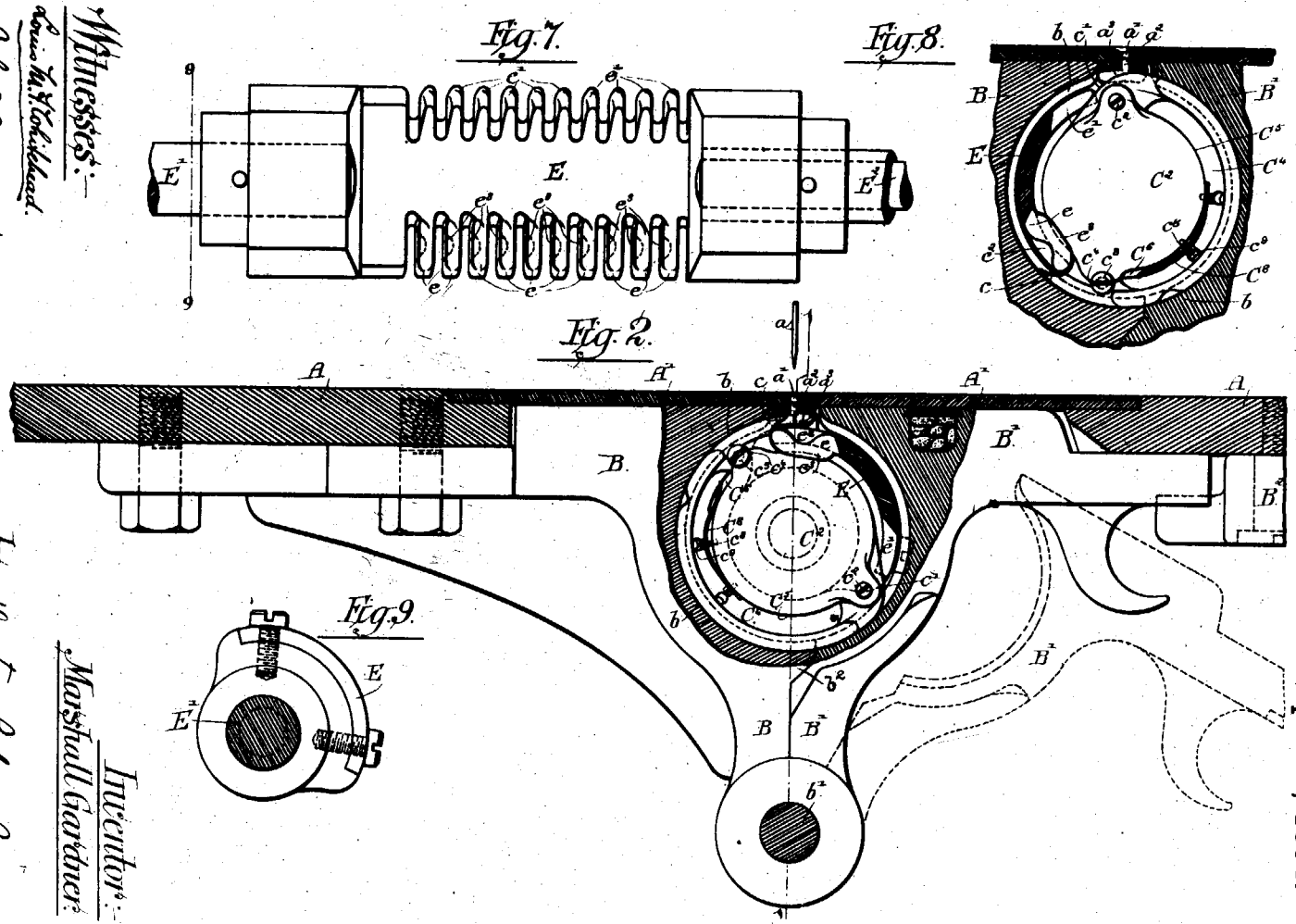
Witnesses:-
Louis M. T. Whitehead.
John W. Adams
Inventor:-
Marshall Gardner.
by:- Clayton Poole & Brown
his Attorneys.

4 Sheets—Sheet 3.
M. GARDNER.
SEWING MACHINE.
No. 11,412. Reissued Apr. 10, 1894.
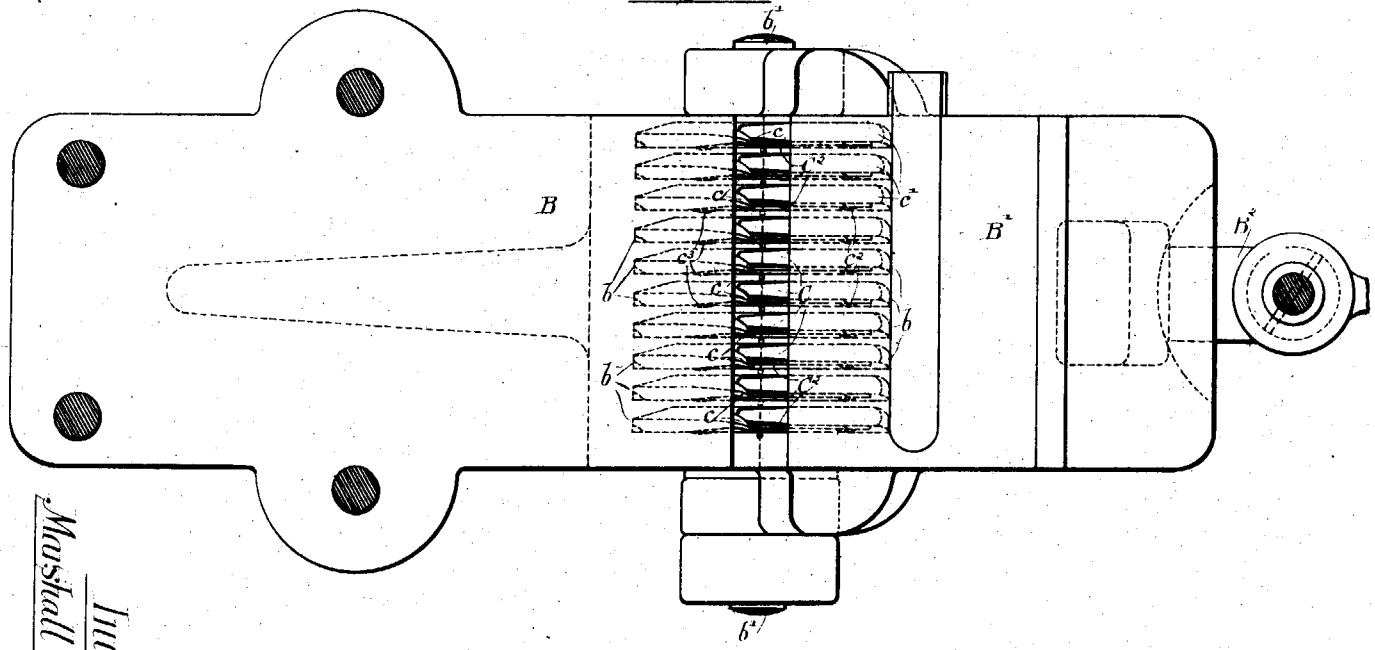
Witnesses:
Louis M. Whitehead.
John W. Adams
Inventor:
Marshall Gardner.
by: Clayton, Poole & Brown,
his Attorneys.

M. GARDNER.
SEWING MACHINE.
No. 11,412. Reissued Apr. 10, 1894.
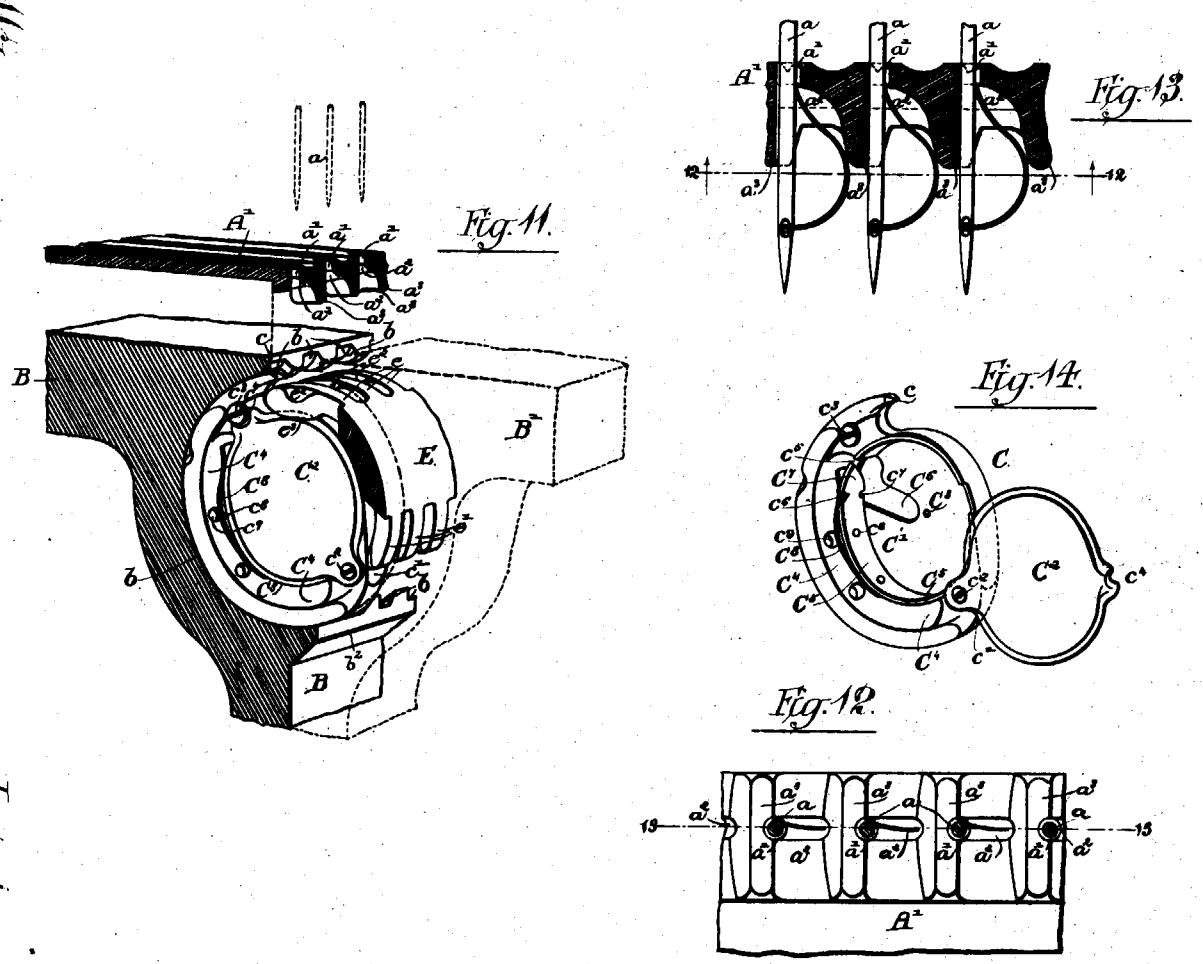
Witnesses:-
Louis M. Whitehead.
John W. Adams.
Inventor:-
Marshall Gardner.
by:- Clayton, Poole & Brown.
his Attorneys.

UNITED STATES PATENT OFFICE.

MARSHALL GARDNER, OF AURORA, ILLINOIS, ASSIGNOR, BY MESNE ASSIGNMENTS, TO THE GARDNER SEWING MACHINE COMPANY, OF SAME PLACE.

SEWING-MACHINE.

SPECIFICATION forming part of Reissued Letters Patent No. 11,412, dated April 10, 1894.

Original No. 447,306, dated March 3, 1891. Application for reissue filed March 2, 1893. Serial No. 464,458.

*To all whom it may concern:*

Be it known that I, MARSHALL GARDNER, of Aurora, in the county of Kane and State of Illinois, have invented certain new and useful Improvements in Sewing-Machines; and I do hereby declare that the following is a full, clear, and exact description thereof, reference being had to the accompanying drawings, and to the letters of reference marked thereon, which form a part of this specification.

This invention relates to an improvement in sewing-machines, having reference more especially to improvements in the stitch-forming mechanism of such machines.

Some of the main features of my invention may be applied to a single-needle machine, but other parts thereof are more especially intended for use in gang-machines.

The invention consists in the matters hereinafter described, and pointed out in the appended claims.

In the accompanying drawings, illustrating my invention, Figure 1 is an elevation, partly in section, taken upon the line 1—1 of Fig. 2, illustrating the stitch-forming devices for a sewing-machine constructed in accordance with my invention. Fig. 2 is a vertical cross-section of the same, taken upon the line 2—2 of Fig. 1. Fig. 3 is a side elevation of one of the shuttles removed from the machine. Fig. 4 is a sectional view of the shuttle, taken upon the line 4—4 of Fig. 3. Fig. 5 is an elevation of the shuttle, showing the side thereof opposite to that seen in Fig. 3. Fig. 6 is a cross-section of the shuttle, taken upon the line 6—6 of Figs. 3 and 5. Fig. 7 is a detail elevation of the shuttle-driver. Fig. 8 is a detail section similar to Fig. 2, showing a changed position of the shuttle. Fig. 9 is a detail section, taken upon the line 9—9 of Fig. 7. Fig. 10 is a plan view of the shuttle-race and other parts beneath the work-plate. Fig. 11 is a sectional perspective view illustrating the work-plate, shuttle-guides, the shuttle-carrier, and one of the shuttles. Fig. 12 is a view from beneath of a part of the throat-plate adjacent to the needles. Fig. 13 is a sectional view, taken upon the line 13—13 of Fig. 12. Fig. 14 is a perspective view of one of the shuttles with the cover thereof open and the thread-cop removed.

As illustrated in the said drawings, A designates the work-plate, A′ the throat-plate, and *a a* the vertical reciprocating needles, of a gang-sewing-machine.

B B′ are two metal parts or castings, located beneath the throat-plate A′ and provided with a series of circular grooves *b b*, forming guides or races for a series of circular or disk-shaped shuttles C C, the peripheries of which are engaged with the said guide-grooves or races. The said shuttles contain central circular recesses concentric with the axis of rotation of the shuttle for containing a closely-wound mass of thread or cop D, which fits closely within said recess and is so wound that the thread may be freely drawn from the center thereof.

The part or casting B, which embraces about one-half of the diameter of the circular shuttle-race, is permanently affixed to the work-plate of the machine by bolts, as shown, or otherwise. The part or casting B′ is movable and is pivotally connected with the stationary part B, so that said movable part B′ may be swung or moved outwardly away from the part B to allow the insertion and removal of the shuttles into and from the circular races or guide-grooves.

As herein shown, the part B′ is connected by means of a pivot-pin *b′* with the casting B at a point below the shuttle-guides, and is held or locked in working position by means of a rotating button or catch $B^2$, pivoted upon the under side of the work-plate.

The throat-plate A′ is provided with a movable section which is located over the casting B′ and closes the space or opening in the work-plate A which is located over said casting. Such opening in the work-plate is made of a width greater than the diameter of the shuttles C C so that when the movable section of the throat-plate is removed and the movable casting B′ thrown downwardly the shuttles may be taken out of the race through said opening.

As a further and separate improvement the stationary casting B instead of constituting exactly one-half of the circular shuttle-race is extended at the lower part of the race past a vertical line drawn through the center of the race so as to form a supporting surface for the shuttles reaching past or beneath the center of gravity of the shuttles when the latter rest within the race. In the particular construction shown the said casting B is thus extended to support the shuttle by means of a projection $b^2$ located adjacent to the inner surface of the shuttle-race or forming a continuation of said inner surface and fitting into a notch or recess in the casting B′ in the manner illustrated.

Each of the shuttles C is provided with a hook or prong *c*, adapted to engage the loop of the needle-thread when said hook is carried past the needle in the oscillatory movement of the shuttle. The said shuttle is cut away or recessed at its margin through a part of its circumference, the cut-away or recessed part extending, desirably, from the said hook *c* through about one-third of the circumference of the shuttle, as clearly shown in the drawings, Figs. 3 and 5. The outer margin of the hook *c* conforms to the circular exterior curve of the shuttle, while the margin of the shuttle at its recess or cut-away part desirably conforms to the curvature of the cop-recess C′.

The several shuttles are actuated by means of an oscillating shuttle-driver E of segmental form in cross-section, said driver being constructed to fit within the space formed by the cut-away portion of the shuttle, exterior to the shuttle and inside of the guide grooves or races. Said shuttle-driver is made of approximately the same width as the said cut-away part of the shuttle, and when oscillated bears alternately against the hook *c* and against the opposing rib or shoulder *c′* at the opposite end of the cut-away part. The driver proper is herein shown as connected with and actuated by a shaft E′, to which power is applied for removing the shuttle. Said shaft is mounted in a bearing $A^2$, attached to the work-plate. The opposite end of the driver is, in a gang-machine having a number of shuttles, desirably connected with a shaft $E^2$, mounted in a bearing $A^3$, whereby pivotal support is afforded for both ends of the shuttle-driver. The said shuttle-driver is arranged, in the machine shown, to oscillate through an arc of somewhat more than half a circle, and is usually given about three-fourths of a complete rotation. The said shuttle-driver being made of such width as to cover about one-third of the circumference of the shuttle, the edges of the said driver overlap or pass the needles, and said driver is therefore provided with a series of notches forming teeth or prongs *e e*, the ends of which engage the hooks *c c* and shoulders *c′ c′* of the shuttles, the prongs passing between the needles at each limit of the movement of the driver. At the time the needles descend the shuttle-driver stands at the extreme limit of its movement in one direction, with the hooks of the shuttles in position to advance through the loops of the needle-thread, as clearly shown in Fig. 2. To avoid possibility of the needles striking the prongs *e e*, which engage said hooks, said prongs are provided with beveled surfaces $e^2$ at the point at which the needles pass or overlap said prongs as said needles descend. The sides of said prongs being located in the same plane with the points of the shuttles, said prongs serve as guides to hold the needles in proper position for engagement of the points of the shuttles with the loops of the needle-thread. With a shuttle-driver of the usual thickness, such as is shown in the drawings, however, the side faces of the prongs will not be sufficiently wide to provide a vertical guide-surface for the needle while at the same time having a beveled surface $e^2$. I therefore construct each of the prongs *e* with an inwardly-extending flange or lip $e^3$, affording a flat guide-surface for the needle inside of the beveled surface $e^2$, as clearly shown in Figs. 1 and 2. Aside from its function of guiding the needle-point the beveled surface $e^2$ also affords a larger space or opening for the expansion of the thread-loop as the needle begins its upward movement, thereby making more certain the engagement of the shuttle-hook with the upper thread.

The shuttle is shown more clearly in Figs. 3, 4, 5, 6, and 14, and is constructed in detail as follows: The shuttle is beveled at its outer margin or periphery at its side opposite that engaged by the needle, thereby making the shuttle thinner at its edges than at its center and providing a large space for the thread-cop at the middle of the shuttle, as clearly shown in the sectional views, Figs. 4 and 6. The shuttle is provided with a cover $C^2$ for the recess, said cover being flat and hinged to the shuttle in such manner that it may be easily opened and closed for inserting the cop. As herein shown, the cover $C^2$ is mounted upon a pivot $c^2$ at one side of the cop and so arranged that it will swing in the same plane with the side of the shuttle when open. For holding the cover closed a set-screw $c^3$ is employed, which is adapted to engage and overlap a projection $c^4$ upon the cover, as clearly shown in Fig. 14. Any other form of catch or locking device may, however, be employed with practically the same result.

$C^3$ is the exit thread-guide of the shuttle, which is located at the center of the bottom wall of the recess C′, so that said thread-guide is located at the center of oscillation of the shuttle. Tension devices adapted to engage the thread in its passage from the cop to the said exit thread-guide are provided as follows:

$C^4$ is a curved recess or cavity formed in the metal of the shuttle between the cop recess C′ and the exterior margin of the shuttle in that part of the shuttle opposite the cut-away portion. Said cavity $C^4$, in connection with the cop recess C′, forms a cylindric flange or wall $C^5$, constituting a part of the wall of the said recess. At one point the said wall $C^5$ is provided with a notch $c^5$, reaching to the bottom of the recess C′, and in said recess is formed a shallow depression $C^6$, which extends to the said notch $c^5$ and beneath the flange $C^5$, so as to leave a free projecting point or prong $C^7$, as clearly shown in Figs. 4 and 14.

$C^8$ is a leaf-spring secured to the outer surface of the wall $C^5$ and bearing at its free end against the outer surface of the projecting part or prong $C^7$. At the upper or outer side of said prong is formed a guide-notch $c^6$, and at the inner side thereof, adjacent to the depression $C^6$, is a similar guide-notch $c^7$. Said prong $C^7$ is desirably pointed or tapered in the manner illustrated, Fig. 14.

The cop is fitted closely within the recess C′, and is arranged to unwind from the center, as before described. The thread from the interior of the cop is let outwardly over the same at the side of the cop adjacent to the cover $C^2$, and is then passed around the prong $C^7$, passing beneath the spring $C^8$, and engaging the guide-notches $c^6$ $c^7$. From the guide-notch $c^7$ the thread passes through the depression $C^6$ to the exit thread-guide $C^3$, through which it passes to the outside of the shuttle. The depression $C^6$ is merely for the purpose of affording space for the thread to prevent the latter rubbing against and displacing the cop. The thread may rest against the cop at the opposite side of the shuttle without detriment, for the reason that at this point the thread is moved outwardly, and will have no tendency to displace the cop when the latter is nearly used up and has the form of a thin ring. The purpose of the notch $c^5$ is obviously to allow the shuttle to be easily threaded, a loop of the shuttle-thread being passed through said notch and over the prong $C^7$ beneath the spring $C^8$ in threading the cop, in a manner readily understood. The said prong $C^7$ is desirably made pointed to facilitate this operation.

$c^8$ is an adjusting-screw inserted through the spring $C^8$ and engaging the flange $C^5$ for the purpose of adjusting the pressure of the tension-spring. A hole $c^9$ is formed in the outer part of the shuttle opposite the said screw $c^8$, which enables the latter to be easily turned for adjusting the pressure of the spring.

In the shuttle constructed as herein described the thread-guide, being located in the bottom of the recess C′, is at the side of the shuttle remote from the hook $c'$, so that the thread passes from the shuttle at the side thereof opposite the face of the shuttle engaged with the needle. This construction, however, makes no material difference in the operation of the stitch-forming devices.

The throat-plate A′ of the machine embraces certain novel features of construction, and is made as follows: The said throat-plate is made considerably thicker at the point above the shuttle than heretofore common, and within the same, adjacent to the needle apertures $a'$ $a'$, are formed a series of narrow recesses $a^2$ $a^2$, extending from the needle apertures transversely to the direction of the motion of the shuttle-hook, or, in other words, parallel with the axis of rotation of the shuttle. Said recesses extend upwardly to points near the upper surface of the throat-plate, as clearly shown in the drawings, Figs. 1 and 13. The purpose of said recesses is to hold or guide the thread-loop as the latter is formed by the lifting of the needle, in the usual manner, in position at right angles to the shuttle-hook, so that the said thread-loop can under no circumstances become displaced or thrown around parallel with the face of the shuttle, and thereby allow the hooks to pass the loop without entering the same. As a further improvement in the construction of the throat-plate, I provide the same with depending flanges $a^3$ $a^3$, extending below the lower surface of the thickened part of the plate containing the recesses $a^2$, and forming a series of grooves of the proper size to engage the margins of the shuttle, the lower surface of the said plates in this construction forming a part or continuation of the several guide-grooves $b$ for the shuttle. The apertures $a'$ of course extend downwardly at the sides of said flanges $a^3$, so as to form guide-grooves of sufficient depth to enable the needles to pass to the points of the shuttle-hooks without striking the same. The presence of the guide-grooves formed by the said flanges $a^3$ $a^3$ obviously insures the retention of the shuttle-hooks accurately in position to engage the thread-loops as the said hooks pass the needle. The said flanges $a^3$ $a^3$ upon the throat-plate, taken in connection with the recesses $a^2$ $a^2$, serve to insure the engagement of the shuttles with the needle-threads, and thereby obviate in a great degree liability of failure to complete every stitch at each reciprocation of the shuttles.

The operation of the parts above described in making the stitch is as follows: At the time the needle descends the point of the hook $c$ of the shuttle stands beneath the throat-plate of the machine slightly at the rear of the needle. As soon as the needle has reached the lowermost limit of its movement and begins its upward movement to form a loop, the point of the shuttle begins to advance and engages said loop. The continued forward movement of the shuttle-hook draws out the loop until the latter has passed beneath the shuttle, this requiring a movement in the shuttle of somewhat more than half but not three-fourths of a turn. When the hook has reached the extreme limit of its forward movement, the needle-thread loop is drawn upwardly out of the hook, and the loop will have thus been carried around the lower thread of the bobbin. The cut-away part of the shuttle is made of such length that when the hook $c$ is at the forward limit of its movement the shoulder $c'$ will stand slightly forward of the needle, so that the loop of the needle-thread may be drawn freely upward through the opening or space afforded by the said cut-away part of the shuttle.

The construction hereinbefore described, by which the shuttle race is made in two parts or sections divided by a horizontal plane and one of which is pivoted at its lower edge to the other so as to swing downwardly and outwardly, combined with a work-plate having an opening which extends at one side of the stationary part of the race a distance greater than the diameter of the shuttles, has the important advantage of enabling the shuttles to be removed one by one from the grooves or shuttle races through the opening in the work-plate, thereby enabling the shuttles to be easily and quickly removed or replaced, while at the same time allowing inspection of the shuttles which are in place in the grooves themselves during the act of inserting or removing the shuttles. Sectional shuttle races as heretofore made have been arranged with a swinging section opening downwardly and no provision has been made for access to the race through the work-plate. In the use of shuttle races thus constructed, therefore, it has been necessary to insert the shuttles by placing the hand beneath the work-plate without being able to see the shuttles or the race during the act of inserting the shuttles. While it may be possible to insert one or two shuttles in this manner, it is entirely impracticable to insert a number of shuttles, as in a gang-machine, with such ease or quickness as is required in the practical use of the machines. By the use of the construction herein shown I am not only enabled to quickly and easily insert the shuttles by access through the work-plate, but the opening provided in the work-plate above the movable section of the shuttle race allows access of light to the race and shuttles therein so that the race may at all times be inspected by the operator and will be sufficiently lighted to enable any one or more of the shuttles to be easily inserted or removed. It will of course be understood in this connection that it is often required to remove and replace one or more shuttles in which the thread runs out or is broken and such removal will be relatively frequent in a gang machine having a large number of shuttles, such as herein shown. In such machines, therefore, it is very desirable that the shuttle should be easily and conveniently extracted from and replaced in the grooves of the shuttle race.

The making of the stationary part of the shuttle race to extend past the center line of the shuttles at the bottom of the race is a feature of construction also possessing great advantages, because it avoids possibility of the shuttles falling by gravity from the races and thereby insures the retention of the shuttles in their proper positions when the movable part of the shuttle race is swung downwardly and outwardly for the purpose of opening the race.

I claim as my invention—

1. The combination, with a series of parallel circular shuttle-races, of a series of circular hooked shuttles engaged therewith and a segmental oscillating driver engaged with said shuttles, said shuttles being each provided with a central recess concentric with the axis of rotation of the shuttle for containing a flat cop, an exit thread-guide passing through the side wall of the shuttle at the center of said recess, and a flat cover for closing said recess, substantially as described.

2. The combination, with a circular shuttle-race, of a circular hooked shuttle engaged therewith and an oscillating segmental driver, said shuttle being provided with a central recess concentric with the axis of rotation of the shuttle, an exit thread-guide passing through the side wall of the shuttle at the center of said recess, a flat cover closing said recess, a tension-spring located in a cavity outside of the central recess and provided with guide-notches for holding the thread in engagement with said spring, substantially as described.

3. The combination, with a series of needles and a series of parallel circular shuttle-races, of a series of circular hooked shuttles engaged with said shuttle-races and a throat-plate extending over the shuttles and having in its under surface grooves forming parts of the shuttle-races, said throat-plate being provided with needle-apertures at the sides of the shuttle-races, and provided also with a series of narrow guide slots or recesses for the thread-loops, extending upwardly from the shuttle-races and laterally from the needle-apertures at one side thereof in a direction transverse to the paths of the points of the shuttles, substantially as described.

4. The combination, with needles and work-plate of a gang sewing-machine, of a series of circular shuttles and a circular shuttle race provided with a plurality of guide-grooves for the shuttles, said shuttle race consisting of two separate parts or castings arranged at opposite sides of the needles and one of which parts is pivoted at a point below the shuttles so that its upper end may swing downwardly and outwardly, said work-plate being provided with an opening located over the pivoted part of the shuttle race, and wider than the diameter of the shuttles, and the stationary part of the race being extended beneath the shuttles past the center of the latter to support the shuttles when the race is open, substantially as described.

In testimony that I claim the foregoing as my invention I affix my signature in presence of two witnesses.

MARSHALL GARDNER.

Witnesses:
C. CLARENCE POOLE,
G. W. HIGGINS, Jr.